Figure 1:
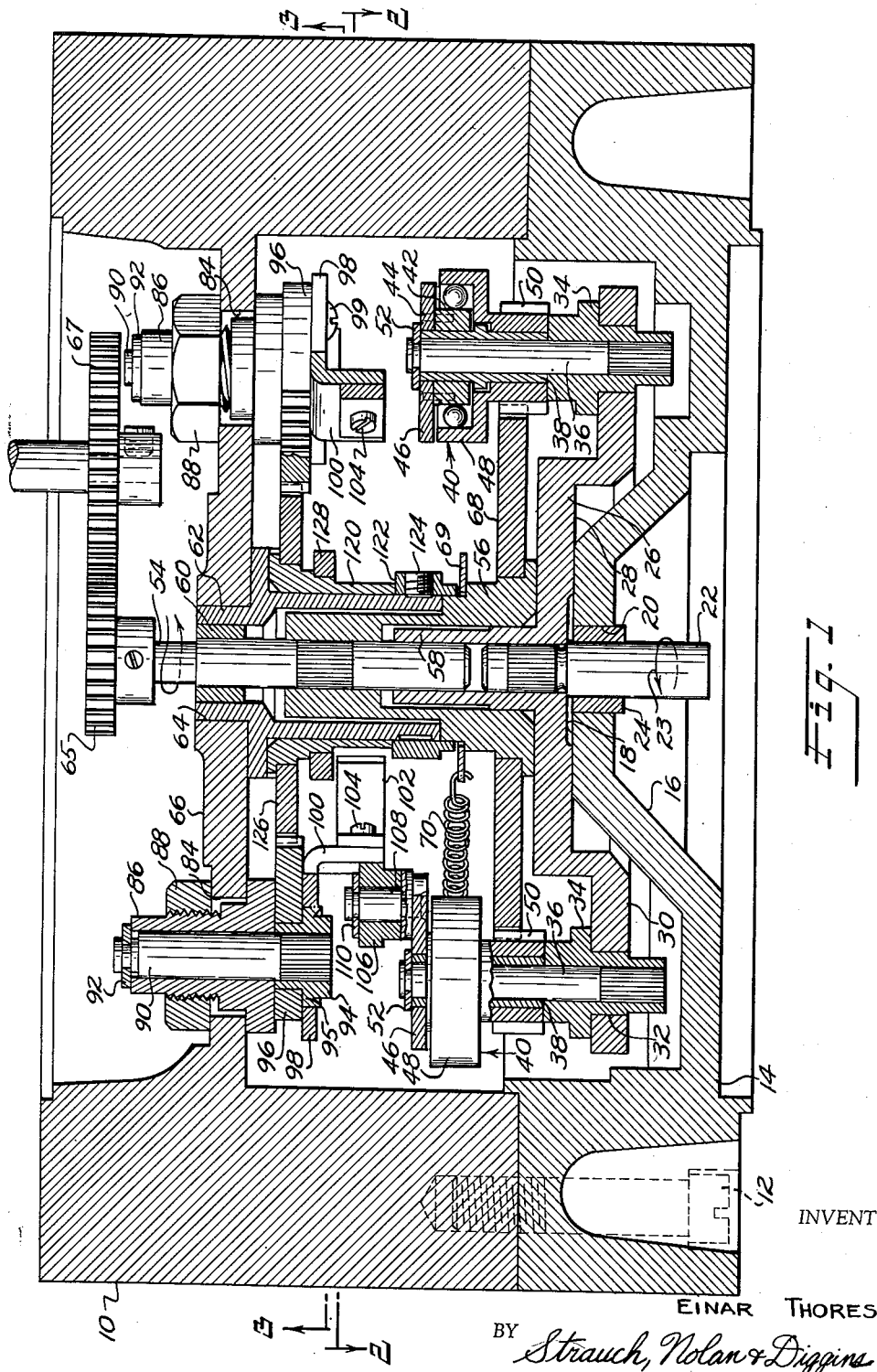

Oct. 2, 1956    E. THORESEN    2,764,901
METER ADJUSTMENT
Filed Nov. 28, 1951    3 Sheets-Sheet 1

INVENTOR
EINAR THORESEN
BY Strauch, Nolan & Diggins
ATTORNEYS

Oct. 2, 1956  E. THORESEN  2,764,901
METER ADJUSTMENT

Filed Nov. 28, 1951  3 Sheets-Sheet 2

INVENTOR
EINAR THORESEN

BY Strauch, Nolan & Diggins
ATTORNEYS

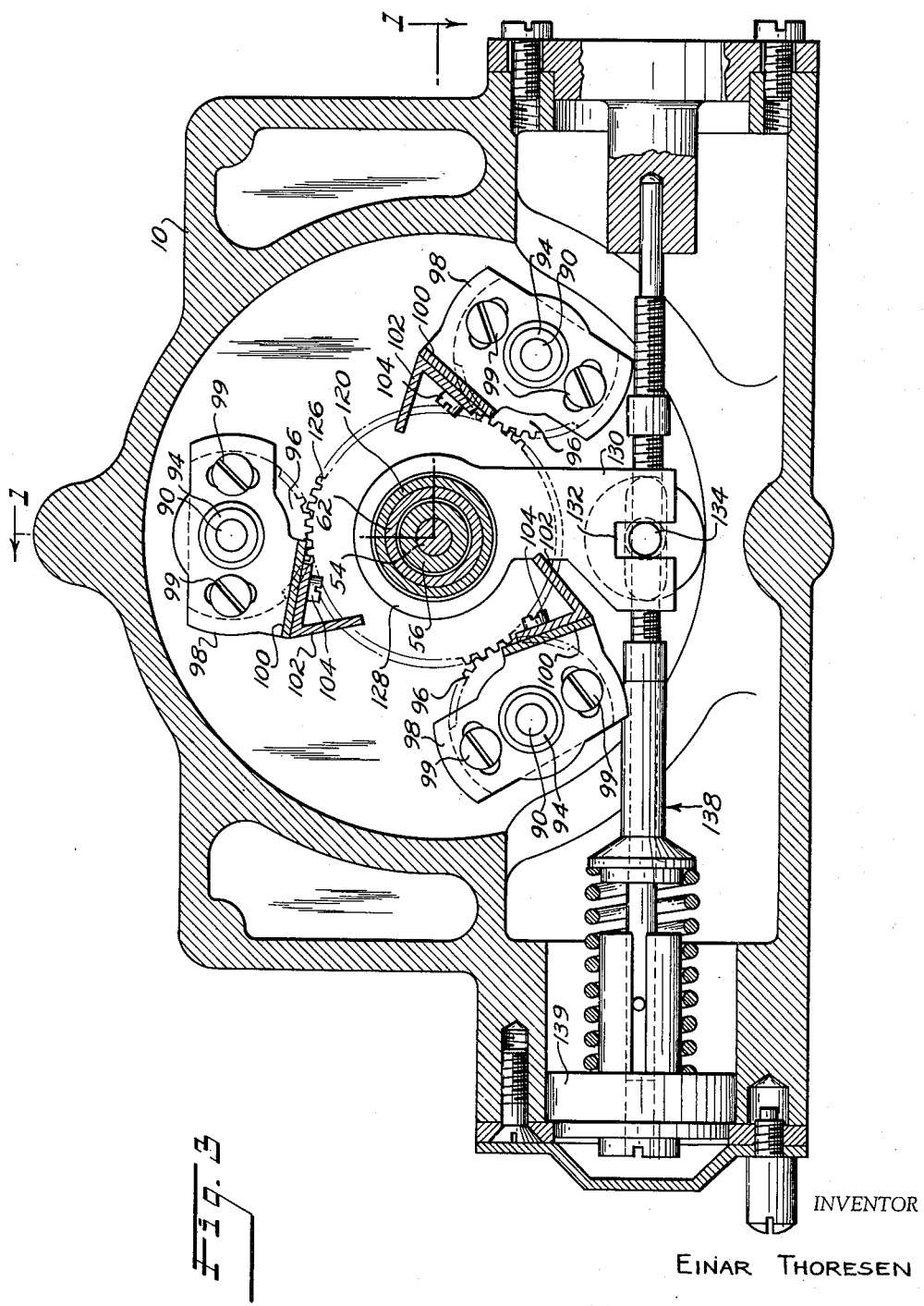

United States Patent Office 2,764,901
Patented Oct. 2, 1956

2,764,901

METER ADJUSTMENT

Einar Thoresen, Pittsburgh, Pa., assignor to Rockwell Manufacturing Company, Pittsburgh, Pa., a corporation of Pennsylvania Application November 28, 1951, Serial No. 258,613

5 Claims. (Cl. 74—679)

This invention relates to variable speed transmissions and more particularly to such transmissions particularly suited for use as fluid meter register drive mechanisms.

It has long been recognized that compensating mechanisms must be included in fluid meters to assure accuracy of the register indication despite variations in temperature, pressure, viscosity and other factors which affect the flow characteristics of the metered fluid.

It has been proposed to incorporate the necessary compensating mechanisms either in the fluid meter circuit or in the mechanism for transmitting the rotation of the meter element to the register.

The present invention is concerned primarily with improved mechanisms of the latter type.

In general mechanisms of this type comprise means for driving the register shaft at a differential speed with respect to the meter shaft by periodically imparting corrective movements to the register shaft in addition to the rotation caused by the meter shaft.

In prior mechanisms of this type it has been the practice to effect the necessary corrective movement at relatively widely spaced intervals, ordinarily once in each revolution of the meter shaft. This condition often caused error in the register reading depending upon whether the reading was taken just before or just after the correction had been introduced by the drive mechanism.

It is, accordingly, the primary purpose and object of the present invention to provide an improved register drive mechanism which minimizes the possibility of obtaining an erroneous register reading by providing a plurality of relatively small adjustment impulses in each revolution of the power shaft.

It is a further object of the present invention to provide an improved register drive mechanism which is infinitely adjustable within its range of operation.

It is also an object of the present invention to provide an improved register drive which permits a greatly extended range of correction.

It is an additional object to provide an improved register drive in which the control factor may be easily and accurately introduced by automatic or manual means.

It is a further object to provide a simplified improved meter register drive which is positive in operation, simple in construction and extremely accurate and flexible in operation.

Figure 2:
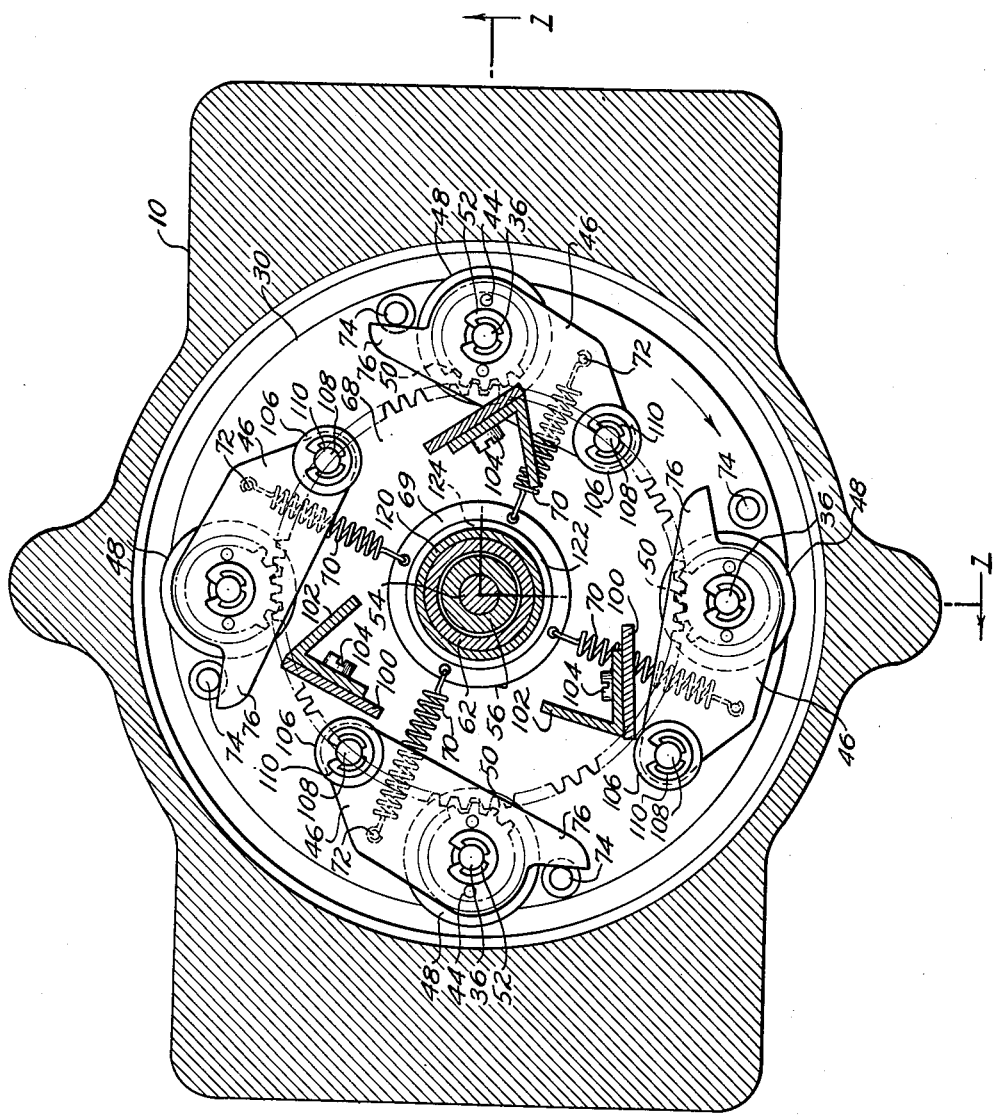

Further objects and advantages will become apparent as the description proceeds in connection with the accompanying drawings and in which:

Figure 1 is a vertical sectional view taken along line 1—1 of Figures 2 and 3 of one embodiment of the present invention; and Figures 2 and 3 are reduced horizontal sectional views taken along lines 2—2 and 3—3, respectively, of the mechanism of Figure 1.

Referring now more particularly to Figure 1, the register drive mechanism is enclosed in a sealed housing comprising an upper housing casting 10 secured by means of suitable bolts 12 to a lower housing casting 14.

A central flange 16 of frusto-conical shape is formed integrally with casting 14 and is provided with an annular bearing surface 18 surrounding a central aperture 20.

A shaft 22 adapted to be driven in the direction of the arrow 23 by any conventional fluid motor mechanism, for example, a motor of the type disclosed in United States Patent No. 2,216,016, is rotatably mounted in a bushing 24 press fitted into aperture 20. A circular gear carrier plate 26 is secured by a knurled press fit to the upper end of the shaft 22 and is provided on its underside with a machine finished bearing surface 28 rotatably supported on the bearing surface 18.

An offset peripheral flange 30 on the carrier 26 is provided with four apertures 32 spaced at 90° intervals, each carrying a hub 34 press fitted therein. Supported in each of the hubs 34 with a knurled press fit is a stud 36 rotatably carrying on its upper portion a sleeve 38 which in turn supports a one-way clutch of conventional design indicated generally at 40. The inner element 42 of each of the clutches is press fitted onto sleeve 38 and is attached by means of rivets 44 to an arm 46. The clutch drums 48 are mounted for rotation on sleeves 38 and are provided with a series of gear teeth 50 around their lower portions. Each of the gears 50 may be termed a planet gear. The clutch and arm assemblies are each retained on stud 36 by means of a snap ring 52. The clutches 40 are each so arranged that the arm 46 is free to rotate with respect to the drum 48 in a clockwise direction (Figure 2) but carries drum 48 with it when rotated in a counterclockwise direction.

With continuing reference to Figure 1, an output or register shaft 54 is secured with a knurled press fit within a sleeve 56 which is rotatably mounted on a cylindrical extension 58 of the gear carrier 26. The lower end of the shaft 54 extends downwardly into and is rotatably received within the extension 58. The upper portion of shaft 54 is rotatably mounted in a bushing 60 mounted in a hub 62 which is telescoped over the sleeve 56 and is press fitted at its upper end into a central aperture 64 in a web 66 formed integrally with the upper housing casting 10.

The shaft 54 is connected through gears 65 and 67 to a conventional indicator mechanism (not shown).

A sun gear 68 is rigidly secured to sleeve 56 and is constantly meshed with the planet gears 50 of clutches 40.

Above the gear 68, sleeve 56 loosely supports a sheet metal ring 69 to which a plurality of tension springs 70 are attached, each of the springs also being attached to one of the arms 46 by means of a stud 72.

The arms 46 are thus spring biased in a clockwise direction (Figure 2) in which direction they are free to rotate with respect to gears 50 until stops 74 extending upwardly from the gear carrier 26 are engaged by an ear 76 provided on each of the arms.

The construction thus far described will drive the output or register shaft 54 at the same speed as the power shaft 22, sleeve 56 being locked to carrier 26 and the drive being transmitted through gear carrier 26, planet gears 50, which are constrained against clockwise movement by arms 46, sun gear 68 and sleeve 56.

The mechanism associated with the upper housing section 10 for modifying the drive will now be described.

With particular reference to Figures 1 and 3, it will be seen that the web 66 in the upper housing casting 10 is provided with three apertures 84 arranged 120° apart on a common circumferential line concentric with the central aperture 64.

Arranged in each of the apertures 84 is a bushing 86 clamped in place by a nut 88. A stud 90 is rotatably fitted in bushing 86 and locked against downward movement by a snap ring 92. Stud 90 non-rotatably carries at its lower end a hub 94. Rotatably supported on each of the hubs 94 above shoulders 95 thereof is a gear segment 96 to which an adjustment plate 98, rotatable about shoulder 95, is secured by screws 99.

Adjustment plates 98 are formed with an integral downwardly extending cam flange 100 to which a V-shaped plate 102 is attached by means of screws 104. The cam flanges 100 extend downwardly into the path of rollers 106 which are rotatably secured to a stud 108 on each of the arms 46 by a snap ring.

It will be seen that with the adjustment plates arranged as in Figure 2, each of the rollers 106 will contact each of the cam flanges 100 in each clockwise revolution of the gear carrier 26. Each cam engaged roller will be displaced outwardly with respect to the axis of shafts 22 and 54 and will rock its arm 46 in a counterclockwise direction. Since each clutch 49 is arranged to prevent counterclockwise movement of its arm 46 with respect to the associated planet gear 50, the latter will be rotated in a counterclockwise direction with arm 46. This rotation of planet gear 50 will in turn impart an increment of movement to sun gear 68, and shaft 54 is momentarily driven in its normal clockwise direction at a speed greater than that of shaft 22 thus effecting a corrective drive impulse. The cam flanges 100 are so located that only one cam flange will be engaged with a roller 106 at any time, and the corrective impulses are imparted to shaft 54 in twelve equally spaced intervals of equal duration for each revolution of shaft 22.

After the rollers have passed over the respective cam surfaces 100, arms 46 will be rotated in a clockwise direction by springs 70 until the ears 76 abut stops 74. During this interval the corresponding planet gear 50 will also be free to rotate in the clockwise direction. However, such rotation will be prevented by at least one of the other planet gears 50 which prevents relative retrograde movement between sun gear 68 and the gear carrier 26. Thus during the return movement of each arm 46 the associated planet gear 50 will be held stationary with respect to gear carrier 26. The V-shaped plates 102 are provided to prevent injury to the mechanism if, for any reason, the gear carrier is rotated in the counterclockwise direction as seen in Figure 2. In this event the rollers 106 will merely ride up over the outer surfaces of plates 102 without injury to any of the parts.

The magnitude and duration of each of the corrective drive impulses to shaft 54 is dependent on the position of the adjustment plates 98 and cam surfaces 100, the displacement of the rollers 106 being greater and the duration of the corrective impulse longer as the cams are located outwardly from the axis of shafts 22 and 54.

The mechanism for effecting the simultaneous adjustment of all of the cam plates 100 will now be described with particular references to Figures 1 and 3.

As shown in Figure 1, a hub 120 is rotatably mounted on the center hub 62 and supported from below by a collar 122 fixed on hub 62 by a set screw 124. Non-rotatably carried on the hub 120 is a gear 126 which meshes with each of the gear segments 96. Also non-rotatably carried by hub 120 is an adjustment plate 128. An extension 130 of plate 128 (Figure 3) is slotted as at 132 to receive a stud 134 carried by an adjustment screw mechanism 138 supported in the housing casting 10. The adjustment screw assembly 138 may be of conventional design for linearly displacing stud 134 upon rotation of head 139. It will be understood that the adjustment mechanism may also be automatically operated in response to the temperature of the metered fluid as disclosed, for example, in United States patent, Serial No. 2,438,935.

Increase of the speed of shaft 54 with respect to shaft 22 may be effected by adjusting screw assembly 138 to dispose the stud 134 to the right as seen in Figure 3 which rotates the plate and gear sectors in a counterclockwise and clockwise direction, respectively, and moves the cams 100 outwardly with respect to the axis of the mechanism. The opposite correction may be applied to reduce the speed of the shaft 54 relative to shaft 22, the lower limit of adjustment establishing a 1:1 drive ratio between the shafts 22 and 54 when the cams 100 are entirely withdrawn from the path of the rollers 106.

While the variable transmission assembly of the present invention has been disclosed as being particularly adapted for use with a register drive mechanism for a meter it will be understood that the device is of general application and may be utilized wherever it is desired to establish a differential speed between a power input shaft and a power output shaft.

It will also be appreciated that the number of corrective speed-up impulses imparted to shaft 54 during each revolution may be increased by increasing correspondingly the number of cams and associated cam driven arm, clutch and gear assemblies.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a casing, an input shaft and an output shaft rotatably mounted on said casing, variable speed transmission means interconnecting said shafts and operable to establish a speed differential between said shafts comprising, a gear carrier attached to said input shaft, a plurality of planet gears rotatably mounted on said carrier, a sun gear mounted for rotation with said output shaft and meshed with said planet gears, a plurality of levers, a one-way clutch connecting each lever to one of said planet gears, said clutches being arranged to prevent relative rotation of said lever with respect to said planet gears when said levers are rotated in one direction, resilient means connected to said levers for urging said levers in the opposite direction, stop means for limiting the movement of said levers and said planet gears in said opposite direction to establish a normal position of said levers and said planet gears, a plurality of independent circumferentially spaced normally fixed cam means supported on said casing adapted to successively engage said levers and rotate each of said levers and said planet gears from its predetermined normal position in said one direction to effect relative rotation of said output shaft with respect to said input shaft, and means for adjusting the radial position of said normally fixed cam means to vary the rotation of said levers and said planet gears from their normal position and to thereby vary the relative rotation of said output shaft with respect to said input shaft.

2. In combination, an input shaft, an output shaft, a sun gear rotatable with said output shaft, a gear carrier rotatable with said input shaft, a plurality of equally spaced planet gears rotatably mounted on said carrier and meshed with said sun gear, a plurality of levers and a uni-directional clutch connecting each lever to one of said planet gears, resilient means biasing each lever in the direction that the lever is relatively movable with respect to its associated planet gear, stop means for limiting the movement of said levers and planet gears in said direction to establish a normal position of said levers and planet gears, a plurality of independently mounted normally fixed cams disposed at circumferentially spaced points in the path of said levers, each adapted to engage and move each lever in the opposite direction away from its normal position during each revolution of said drive shaft for periodically rocking each of said planet gears to impart a plurality of speed increasing impulses to said output shaft during each revolution of each input shaft, each lever and planet gear returning to said normal position between periods of engagement with said cam means and means for adjusting the radial position of said normally fixed cams to vary the rotation of said planet gears from their normal position to thereby vary the relative rotation of said output shaft with respect to said input shaft.

3. In combination, a casing, an input shaft and an output shaft rotatably mounted on said casing, variable speed transmission means interconnecting said shafts and operable to establish a speed differential between said shafts comprising, a gear carrier attached to said input shaft, a plurality of planet gears rotatably mounted on said carrier, a sun gear mounted for rotation with said output shaft and meshed with said planet gears, a plurality of levers, a one-way clutch connecting each lever to one of said planet gears, said clutches being arranged to prevent relative rotation of said lever with respect to the associated planet gear when said lever is rotated in one direction, stop means for limiting the movement of said levers and said planet gears in the opposite direction to establish a normal position of said levers and said planet gears, a plurality of independent spaced cam means supported on said casing adapted to successively engage said levers and rotate each of said levers and said planet gears from its predetermined normal posittion in said one direction to effect relative rotation of said output shaft with respect to said input shaft, said cam means comprising two angularly related surfaces inclined with respect to a radius of the gear carrier whereby upon reversal of said input shaft said levers will ride over said surfaces without damage to the mechanism, and means for adjusting the radial position of said cam means to vary the rotation of said planet gears from their normal position and to thereby vary the relative rotation of said output shaft with respect to said input shaft.

4. In combination, a casing, an input shaft and an output shaft rotatably mounted on said casing, variable speed transmission means interconnecting said shafts and operable to establish a speed differential between said shafts comprising, a gear carrier attached to said input shaft, a plurality of planet gears rotatably mounted on said carrier, a sun gear mounted for rotation with said output shaft and meshed with said planet gears, a plurality of levers, a one-way clutch connecting each lever to one of said planet gears, said clutches being arranged to prevent relative rotation of said levers with respect to said planet gears when said levers are rotated in one direction, stop means for limiting the movement of said levers and said planet gears in the opposite direction to establish a normal position of said levers and said planet gears, a plurality of independent spaced cam means supported on said casing adapted to successively engage said levers and rotate each of said levers and said planet gears from its predetermined normal position in said one direction to effect relative rotation of said output shaft with respect to said input shaft, and means for adjusting the radial position of said cam means to vary the rotation of said planet gears from their normal position and to thereby vary the relative rotation of said output shaft with respect to said input shaft comprising a primary adjusting gear rotatable by external means and a plurality of secondary adjusting gears non-rotatably secured to said cam means and in constant mesh with said primary adjusting gear.

5. In combination, an input shaft, an output shaft, a sun gear rotatable with said output shaft, a gear carrier rotatable with said input shaft, a plurality of equally spaced planet gears rotatably mounted on said carrier and meshed with said sun gear, a plurality of levers, a unidirectional clutch connecting each lever to one of said planet gears, resilient means biasing each lever in the direction that the lever is movable with respect to its associated planet gear, stop means for limiting the movement of said levers and planet gears in said direction to establish a normal position of said levers and planet gears, a plurality of independently mounted cams disposed in the path of said levers, each adapted to engage and move each lever in the opposite direction away from its normal position during each revolution of said drive shaft for periodically rocking each of said planet gears to impart a plurality of speed increasing impulses to said output shaft during each revolution of said input shaft, each lever and planet gear returning to said normal position between periods of engagement with said cams, and means for radially adjusting said cams simultaneously to vary their period of engagement with said levers and thereby the speed differential between said shafts comprising a primary adjustment gear rotatable by external means, and a plurality of secondary adjusting gears non-rotatably secured to each of said cams and in constant mesh with said primary adjusting gear.

References Cited in the file of this patent

UNITED STATES PATENTS

| | | |
|---|---|---|
| 1,624,835 | Hatcher | Apr. 12, 1927 |
| 1,732,247 | Tornberg | Oct. 22, 1929 |
| 1,770,132 | Fraunhofen | July 8, 1930 |
| 2,159,739 | Johnson | May 23, 1939 |
| 2,162,375 | Chrisman | June 13, 1939 |
| 2,291,883 | Craig | Aug. 4, 1942 |

FOREIGN PATENTS

| | | |
|---|---|---|
| 457,881 | Germany | Mar. 26, 1928 |